United States Patent [19]
Hayashi et al.

[11] Patent Number: 5,349,455
[45] Date of Patent: Sep. 20, 1994

[54] ELECTRO-OPTICAL PLASMA ADDRESSING DEVICE WITH CATHODES HAVING DISCHARGE, RESISTIVE AND VOLTAGE SUPPLYING PORTIONS

[75] Inventors: Masatake Hayashi; Motoharu Nishida, both of Kanagawa, Japan

[73] Assignee: Sony Corporation, Japan

[21] Appl. No.: 50,807

[22] Filed: Apr. 21, 1993

[30] Foreign Application Priority Data

Apr. 21, 1992 [JP] Japan .................. 4-128265

[51] Int. Cl.⁵ .................. G02F 1/133; G09G 3/28; H01J 17/49
[52] U.S. Cl. .................. 359/54; 359/87; 359/79; 315/169.4; 313/582
[58] Field of Search .................. 359/54, 55, 74, 79, 359/87; 345/60, 74, 87; 315/169.4, 169.1; 313/517, 582, 484, 491

[56] References Cited

U.S. PATENT DOCUMENTS

| | | | |
|---|---|---|---|
| 4,896,149 | 1/1990 | Buzak et al. | 345/60 |
| 5,077,553 | 12/1991 | Buzak | 345/60 |
| 5,221,979 | 6/1993 | Kim | 359/54 |
| 5,272,472 | 12/1993 | Buzak | 345/60 |

OTHER PUBLICATIONS

"Mechanism of Discharge Build-Up And High-Speed Addressing of a Townsend-Discharge Panel TV Using Pre-Discharges 2320 Proceedings of the SID 31" (1990) No. 4, NY US.

Primary Examiner—William L. Sikes
Assistant Examiner—Tai Van Duong
Attorney, Agent, or Firm—Hill, Steadman & Simpson

[57] ABSTRACT

An electro-optical plasma addressing device comprises a first substrate; a set of parallel first electrodes formed on the first substrate, a second substrate disposed opposite to the first substrate; a set of parallel second electrodes formed on the second substrate; a liquid crystal layer interposed between the first and second substrates; walls formed on the second electrodes so as to form discharge chambers by partitioning a space formed between the liquid crystal layer and the second substrates; and an ionizable gas sealed in the discharge chambers. Each second electrode has a terminal portion, resistive portions connected to the terminal portion, and discharge portions connected respectively to the extremities of the resistive portions, and these portions of the second electrode are formed in a plane. In a modification, the second electrode has a laminate construction consisting of a terminal portion formed on the second substrate, a resistive portion formed on the terminal portion, and discrete discharge portions formed and arranged at a specified pitch on the resistive portion.

8 Claims, 5 Drawing Sheets

F I G. 2
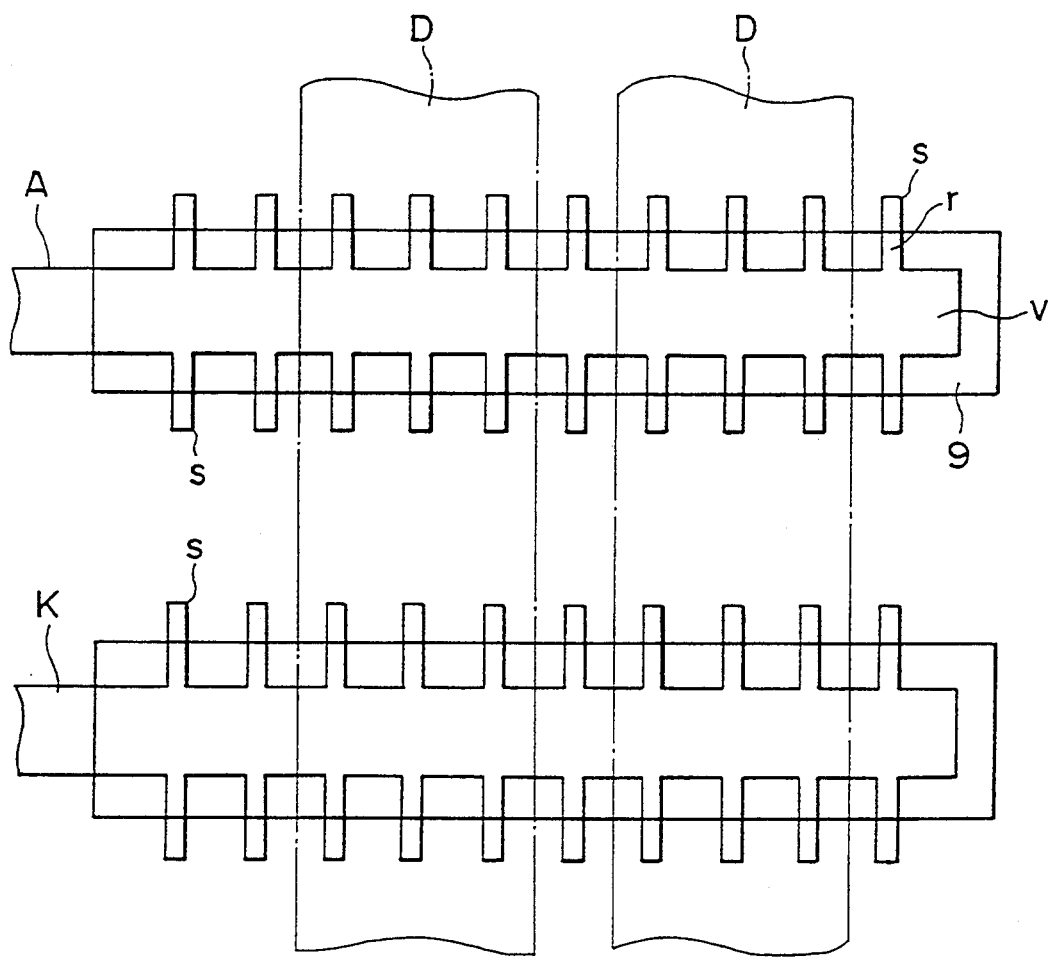

ELECTRO-OPTICAL PLASMA ADDRESSING DEVICE WITH CATHODES HAVING DISCHARGE, RESISTIVE AND VOLTAGE SUPPLYING PORTIONS

BACKGROUND OF THE INVENTION

1. Field of the Invention

The present invention relates to an electro-optical plasma addressing device having a two-layer construction, consisting of an electro-optical cell, such as a liquid crystal cell, and a plasma cell and, more specifically, to the electrode construction of the plasma cell of an electro-optical plasma addressing device.

2. Description of the Related Art

An active matrix addressing system is a generally known means for enhancing the resolution and contrast of an electro-optical device of a matrix type employing a liquid crystal cell as an electro-optical cell, such as a liquid crystal display. The active matrix addressing system employs switching elements, such as thin-film transistors or the like, in combination with the picture elements and drives the switching elements in linear sequence. Since the active matrix addressing system needs a substrate provided with a plurality of semiconductor elements, such as thin-film transistors, the percentage of acceptable electro-optical optical devices of a matrix type decreases when the size of the display panel is increased.

A means for eliminating such a disadvantage of the electro-optical device, disclosed in Japanese Patent Laid-open (Kokai) No. 1-217396 (corresponding to U.S. Pat. Nos. 4,896,149 and 5,077,553) employs plasma switches instead of the switching elements, such as thin-film transistors. The construction of a plasma addressing display employing plasma switches for driving a liquid crystal cell will be briefly described hereinafter.

Referring to FIG. 6, the plasma addressing display has a laminate flat panel construction comprising a liquid crystal cell 101, a plasma cell 102 opposed to the liquid crystal cell 101, and an intermediate plate 103 held between the liquid crystal cell 101 and the plasma cell 102. The plasma cell 102 has a glass substrate 104 provided in its surface with a plurality of parallel grooves 105 extending, for example, along the rows of a matrix. The grooves 105 are covered closely with the middle plate 103 to form separate plasma chambers 106. An ionizable gas is sealed in the plasma chambers 106. Ridges 107 between the adjacent grooves 105 serves as partition walls separating the plasma chambers 106 from each other and as gap spacers spacing apart the plasma chambers 106. A pair of parallel electrodes 108 and 109 are extended on the bottom surface of each groove 105 for ionizing the gas sealed in the plasma chamber 106 to produce a discharge plasma. The electrodes 108 are anodes A, and the electrodes 109 are cathodes K. Such discharge regions are row scanning units.

The liquid crystal cell 101 has a transparent substrate 110 disposed opposite to the intermediate plate 103 with a specified gap therebetween and the gap is filled up with a liquid crystal 111. Signal electrodes D of a transparent conductive material are formed on the inner surface of the transparent substrate 110. The signal electrodes D extend perpendicularly to the axes of the plasma chambers 106 to function as column driving units. The virtual intersections of the row scanning units and the column driving units form a matrix of picture elements.

The operation of the plasma addressing display of FIG. 6 will be described briefly with reference to FIG. 7.

An external driving circuit for driving the plasma addressing display comprises a signal circuit 201, a scanning circuit 202 and a control circuit 203. The signal electrodes D1 to Dm, which function as column driving units, are connected respectively through buffers to the signal circuit 201, the cathodes K1 to Kn are connected respectively through buffers and resistors R to the scanning circuit 202, and the anodes A1 to An are connected to a common ground. The scanning circuit 202 scans the cathodes K1 to Kn in linear sequence, and the signal circuit 201 applies analog image signals to the signal electrodes D1 to Dm in synchronism with the scanning operation of the scanning circuit 202. The control circuit 203 controls the signal circuit 201 and the scanning circuit 202 for synchronous operation. A plasma discharge region, i.e., a row scanning unit, is formed along the selected cathode Kj (j=1, 2, ..., n−1 or n). The virtual intersections of the row scanning units and the column driving units form picture elements 204.

Load resistors R are connected respectively to the cathodes K1 to Kn to secure uniform plasma discharge over the entire area of the screen by suppressing difference in discharge current between the row scanning units. If an excessive discharge current is supplied to the cathode Kj, a voltage drop according to the current occurs across the corresponding loading resistor R to suppress the variation of effective voltage applied to the cathode Kj.

Referring to FIG. 8 showing two picture elements 204 among those of the plasma addressing display of FIG. 7, each picture element 204 is formed by connecting a sampling capacitor consisting of the signal electrode D1 (D2) and the liquid crystal 111 filling the gap between the transparent substrate 110 and the intermediate plate 103, and a plasma sampling switch S in series. The function of the plasma sampling switch S is equivalent to that of the discharge region, i.e., the row scanning unit. When activated, the interior of the discharge region is kept substantially generally at an anode potential. After plasma discharge has terminated, the potential of the discharge region coincides with a floating potential. An analog image signal is applied through the sampling switch S to the sampling capacitor of the picture element 204 for sampling hold.

Whereas the known plasma display panel forms a point-like discharge region, this plasma addressing display addresses the picture elements addressed through the plasma sampling switches. In this plasma addressing display, a discharge region, i.e., the row scanning unit, is formed between the paired anode and cathode. The length of this discharge region is considerably long when the plasma addressing display has a large screen and local discharge occurs to form a nonuniform row scanning unit due to voltage drop caused by the resistances of the anode and the cathode. If a nonuniform row scanning unit is formed, the resistances of the plasma sampling switches S differ from each other. Although the loading resistor R is connected to each cathode to produce uniform plasma discharge in the row scanning unit, the loading resistor R is unable to suppress the occurrence of local plasma discharge. Accordingly, a sufficiently high current must be supplied to the row scanning unit to produce stable plasma discharge over the entire length of the row scanning unit. Consequently, the contrast of the image displayed on the plasma addressing display is reduced by unnecessary plasma, power consumption is increased and the life of the plasma addressing display is shortened. Thus, when plasma discharge in the row scanning unit having a large length is controlled by the conventional discharge current compensating system, the distribution of plasma discharge is liable to vary delicately and the local variation of the distribution of plasma discharge cannot be absorbed and, therefore, the picture elements differ unavoidably from each other in brightness.

SUMMARY OF THE INVENTION

Accordingly, it is an object of the present invention to provide an electro-optical plasma addressing device provided with an electrode construction capable of producing uniform plasma discharge over the entire region of each of discharge regions forming linear scanning units.

An electro-optical plasma addressing device in one aspect of the present invention comprises, as principal components: a first substrate (electro-optical substrate); a plurality of parallel first electrodes (signal electrodes) formed on an inner major surface of the first substrate; a second substrate (plasma substrate) disposed opposite to the first substrate; a plurality of parallel second electrodes (plasma electrodes) formed on the inner major surface of the second substrate facing the first substrate so as to extend perpendicularly to the first electrodes; an electrooptic layer formed between the first and second substrates; and an ionizable gas sealed in plasma chambers formed between the electrooptic layer and the second substrate. The second electrodes are anodes and cathodes. Each cathode has discharge portions, a terminal portion and resistive portions interconnecting the discharge portions and the terminal portion, and the terminal portion and the resistive portions are coated with an insulating layer. Discharge produced between the adjacent anode and cathode ionizes the gas sealed in the corresponding plasma chamber to form a local discharge region as a scanning unit, and a portion of the electrooptic layer at the intersection of the first electrode and the discharge region is driven.

The discharge portions of the second electrodes are connected through the resistive portions to the terminal portions, respectively, and the plurality of discrete discharge portions are arranged two-dimensionally. In one form of the present invention, each second electrode may have a terminal portion, a resistive portion and discharge portions stacked in that order, and the discharge portions may be arranged discretely on the resistive portion.

At least the second electrode serving as as a cathode has the terminal portion, the discharge portions and the resistive portions, namely, separate functional portions. The terminal portion is formed of a material having a low resistivity and extended over the entire length of the scanning unit and suppresses voltage drop to the least extent. The discharge portions are arranged discretely so as to correspond to picture elements, respectively, and emit electrons for discharge. The resistive portions connect the discrete discharge portions, respectively, to the terminal portion, serve as loading resistors and have a self-biasing function; that is, the resistive portions absorb the difference between currents supplied to the discrete discharge portions to prevent local plasma discharge so that stable, uniform plasma discharge occurs over the entire length of the scanning unit.

BRIEF DESCRIPTION OF THE DRAWINGS

The above and other objects, features and advantages of the present invention will become more apparent from the following description taken in connection with the accompanying drawings, in which:

FIG. 2 is a plan view of a pattern of discharge electrodes;

DESCRIPTION OF THE PREFERRED EMBODIMENTS

Figure 1:
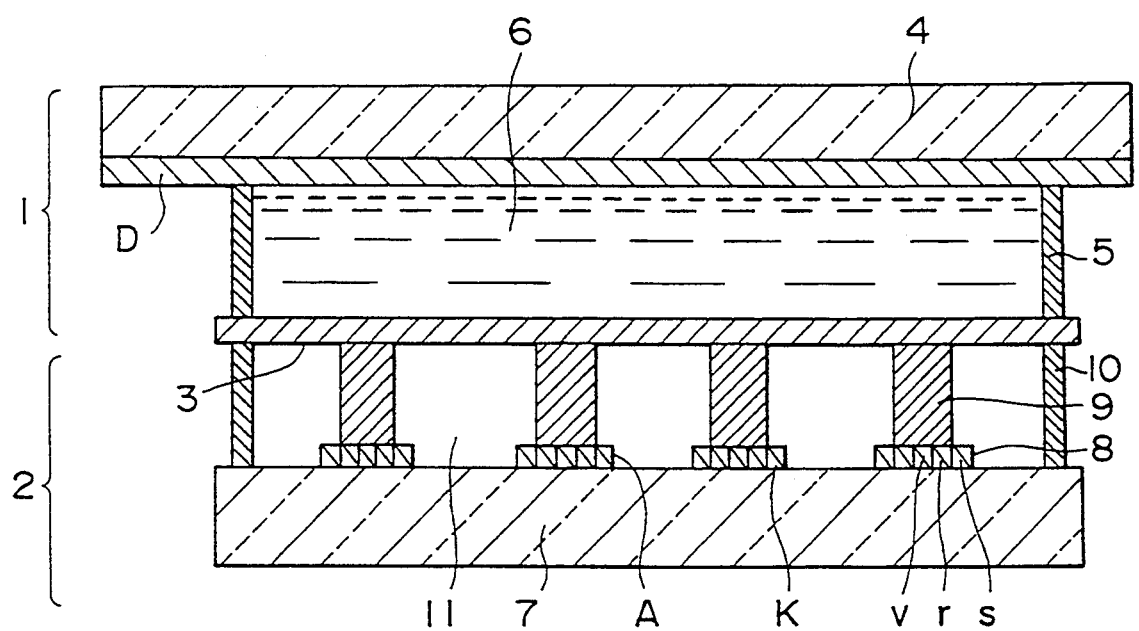
FIG. 1 is a typical sectional view of an electro-optical plasma addressing device in a first embodiment according to the present invention.

Referring to FIG. 1 showing an electro-optical plasma addressing device in a first embodiment according to the present invention, the electro-optical plasma addressing device has a flat construction comprising a liquid crystal cell 1, a plasma cell 2 and an intermediate plate, i.e., a dielectric sheet, interposed between the liquid crystal cell 1 and the plasma cell 2. The liquid crystal cell 1 has a first substrate 4, such as a glass substrate, provided on its inner major surface with a plurality of parallel first electrodes D formed by patterning a transparent conductive film and serving as signal electrodes. The first substrate 4 and the intermediate plate 3 are spaced apart with a spacer 5 adhesively joined to the first substrate 4 and the intermediate plate 3 so as to form a sealed space. The space formed between the first substrate 4 and the intermediate plate 3 is filled up with a liquid crystal, i.e., an electrooptic material, to form a liquid crystal layer 6. The liquid crystal may be substituted by a solid electro-optical plate, such as an electrooptical crystalline plate. When a solid electro-optical plate is employed, the intermediate plate 3 may be omitted.

The plasma cell 2 has a second substrate 7, such as a glass substrate, and a plurality of parallel second electrodes 8, i.e., discharge electrodes, formed on the inner major surface of the second substrate 7 so as to extend perpendicularly to the first electrodes D. The second electrodes 8 are alternate anodes A and cathodes K. Each second electrode 8 has discharge portions s, a terminal portion v and resistive portions r connecting the discharge portions s to the terminal portion v, which are arranged in a plane. The terminal portion v and the resistive portions r are covered with a wall 9 serving as an insulating layer and a spacer. The walls 9 are extended on the second electrodes 8 along the direction of rows. The upper ends of the walls 9 are joined to the lower surface of the intermediate plate 3. A sealing member 10 is joined adhesively to the second substrate 7. Thus, plasma chambers 11 are formed by the intermediate plate 3, the second substrate 7, the walls 9 and the sealing member 10. Each plasma chamber 11 forms a discharge region serving as a row scanning unit. The discharge regions communicate with each other. An ionizable gas, such as helium gas, neon gas, argon gas or a mixture of these gases, is sealed in the plasma chambers 11.

FIG. 2 shows only a pair of second electrodes 8 serving as an anode A and a cathode K, among the plurality of second electrodes 8 to facilitate understanding. The anode A and the cathode K may be formed by printing an electrode material in a thick film having a substantially herringbone pattern or by forming a thin film of an electrode material and patterning the thin film by a photolithographic etching process. The broad central portion of the second electrode 8 is a terminal portion v. Since the terminal portion v has a low resistivity, a voltage can be applied stably to the entire length of the second electrode 8. The terminal portion v is covered perfectly with the wall 9. Lateral projections projecting from the terminal portion v are resistive portions r, and the extremities of the resistive portions r are discharge portions s. Thus, plasma discharge is produced preferentially between the respective discharge portions s of the adjacent anode A and the cathode K; that is, the discrete discharge portions s arranged lengthwise of the second electrodes 8 exchange charged particles of the plasma. The width and the length of the discharge portions s are determined properly so that an optimum discharge current flows across the adjacent discharge portions s. The resistive portion r connects the discharge portion s to the terminal portions v. The resistance of each resistive portion r is dependent on the width and length of thereof. The resistive portions r function as loading resistors for the corresponding discharge portions s. Thus, the display panel of the electro-optical plasma addressing device is provided internally with loading resistors instead of external resistors, which are needed by the discharge electrodes of the conventional plasma addressing device, and the loading resistors can be easily incorporated into the second electrodes by forming the second electrodes in a herringbone-like pattern.

As mentioned above, a pair of second electrodes 8, i.e., the anode A and the cathode K, forms one row scanning unit. The first electrodes D extending perpendicularly to the row scanning units form column driving units. The virtual intersections of the row scanning units and the column driving units formed at right angles define picture elements in the liquid crystal layer 6. As shown in FIG. 2, three pairs of discharge portions s are allocated to each picture element. When the pitch of the discharge portions s is small as compared with the pitch of the picture elements, uniform plasma discharge can be produced. Practically, the pitch of the discharge portions s may be equal to that of picture elements at the largest and, preferably, a fraction of the pitch of the picture elements.

Figure 3:
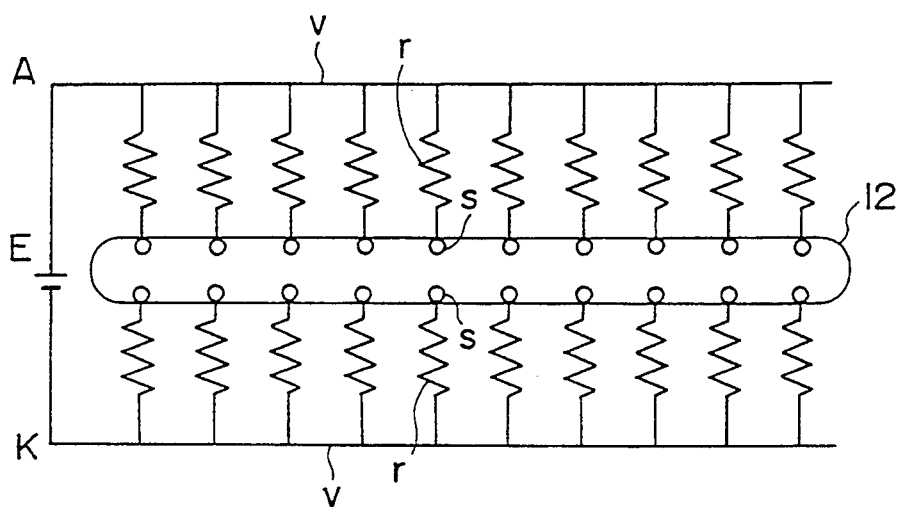
FIG. 3 is a circuit diagram of an equivalent circuit representing the pattern of discharge electrodes.

FIG. 3 is an equivalent circuit representing one row scanning unit. A power source E of a specified output voltage is connected across the pair of second electrodes, i.e., the anode A and the cathode K. The discharge portions s are branched from the terminal portion v of each second electrode 8, and the resistive portion r is formed between each discharge portion s and the terminal portion v. The longitudinal arrangement of pairs of opposite discharge portions s of the anode A and the cathode K defines a discharge region 12. When an excessive current flows across one of the pairs of discharge portions s, voltage drop occurs across the corresponding resistive portions r to suppress the current. Thus, the self-biasing effect absorbs difference in current between the pairs of discharge portions s.

The terminal portions v and the resistive portions r may be covered with an insulating film having masking effect instead of being covered with the walls 9. The second electrodes need not necessarily have the herringbone-like pattern, provided that the second electrodes have the terminal portion, the discharge portion and the resistive portion which are differentiated functionally from each other. Although both the anode A and the cathode K of this embodiment have the discrete discharge portions and the resistive portions associated respectively with the discharge portions, sufficiently high discharge current averaging effect can be expected even if only the cathodes K have the discrete discharge portions. The cathodes K emit electrons, i.e., negative charge, and are the targets subject to the bombardment by ions, i.e., positive charge. Accordingly, the intensity of the discharge current is affected greatly by the shape of and irregularities in the surface of the cathodes K and, therefore, it is effective to apply the present invention to the cathodes K.

Figure 4:
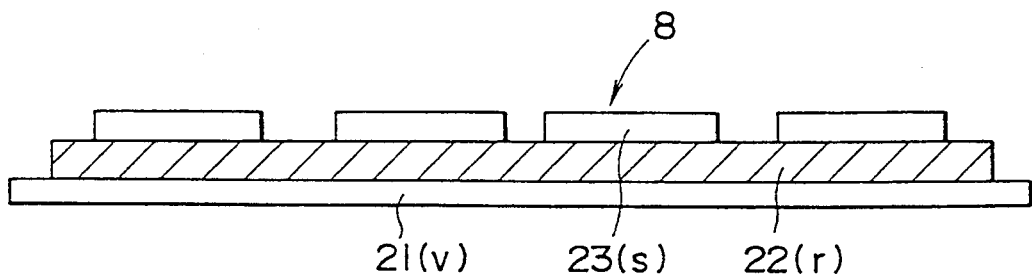
FIG. 4 is a sectional view of an arrangement of discharge electrodes employed in an electro-optical plasma addressing device in a second embodiment according to the present invention.

FIG. 4 shows an electro-optical plasma addressing device in a second embodiment according to the present invention. This electro-optical plasma addressing device is provided with second electrodes 8, i.e., discharge electrodes, each having functionally differentiated portions stacked in layers. Each second electrode 8 has a terminal layer 21, a resistive layer 22 formed on the terminal layer 21, and discrete discharging pads 23 formed on the resistive layer 22. The terminal layer 21 is formed by patterning a film having a low resistivity. The terminal layer 21 corresponds to the terminal portion v of the first embodiment. The resistive layer 22 is formed by patterning a film of a material having a high resistivity. The resistive layer 22 corresponds to the resistive portions r of the first embodiment. The discharge pads 23 are arranged separately along the longitudinal direction of the second electrode 8. The discharge pads 23 correspond to the discharge portions s of the first embodiment. The second electrode 8 is formed by covering the terminal layer 21 with the resistive layer 22 having a resistivity in the range of about 10 k$\Omega$.cm and several hundreds k$\Omega$.cm, and discretely arranging the point-shaped discharge pads 23 on the resistive layer 22. When plasma discharge is produced across the adjacent second electrodes 8, the resistive layer 22 underlying the discharge pads 23 absorbs the local variation of discharge current at the discharge pads 23 and, consequently, discharge current that flows through each discharge pad 23 is stabilized. Since difference between discharge conditions at the picture elements is reduced, irregularities in brightness on the display panel can be reduced or eliminated. Since the terminal layer 21, i.e., the lowermost layer, does not function as a discharge portion, irregularities in the shape of the terminal layer 21, voltage drop in the terminal layer 21, and disturbance or noise in the discharge space do not act as direct causes of variation in the discharge condition. Since the discharge current flows through the resistive layer 22, i.e., an intermediate layer, to the point-shaped discharge pads 23, the voltage drop in the resistive layer 22 varies according to the variation of the discharge current, and, consequently, the discharge current that flows through the discharge pads 23 is adjusted to a fixed value by the negative feedback control effect of the resistive layer 22. Thus, the resistive layer sup-presses the variation of discharge condition.

Figure 5:
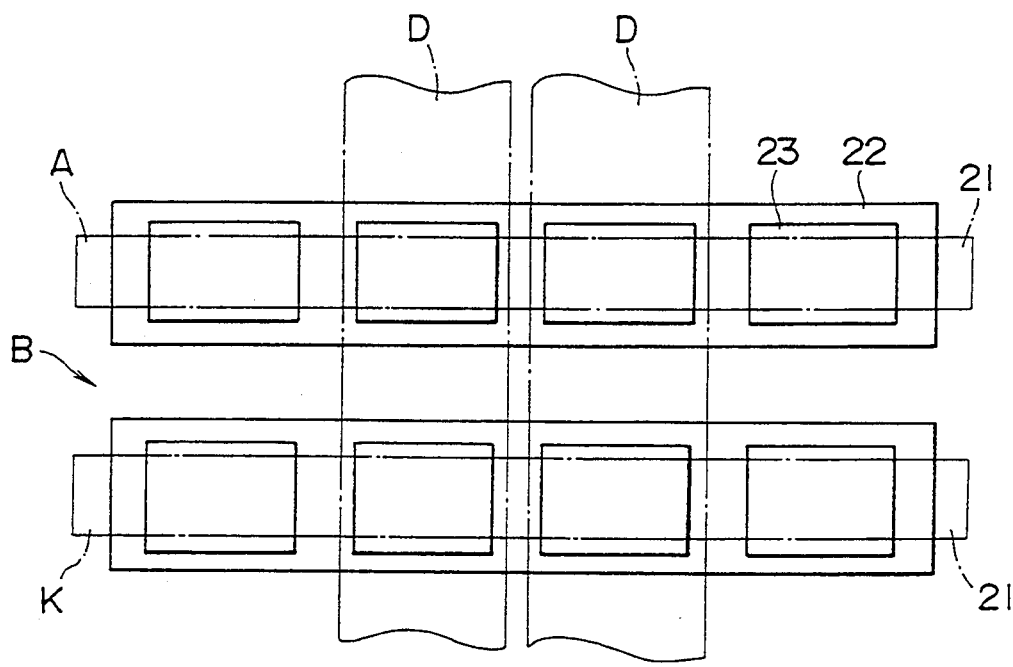
FIG. 5 is a plan view of the discharge electrodes of FIG. 4.
Figure 6:
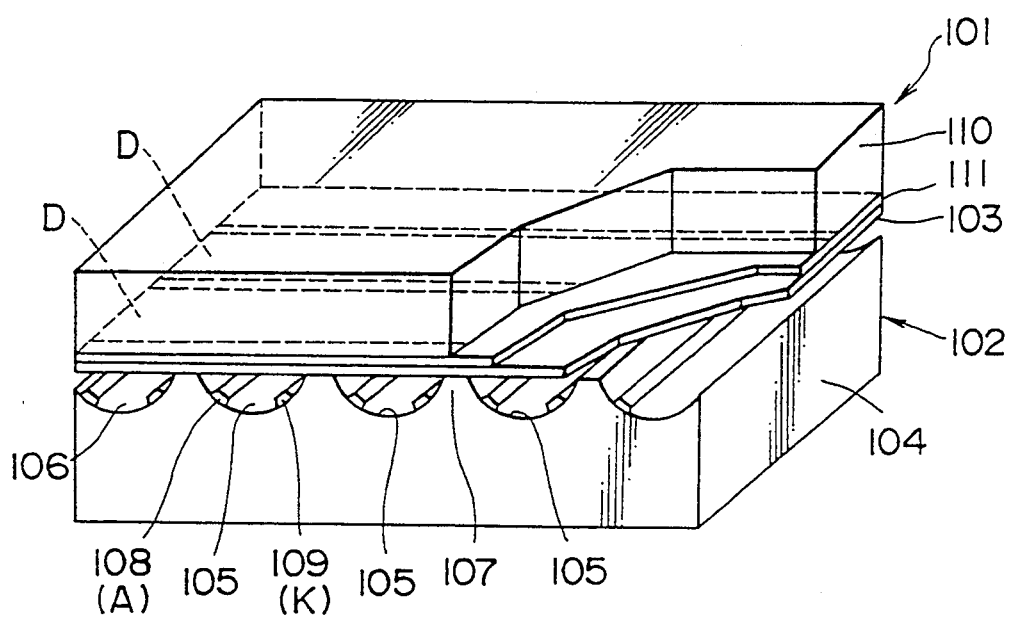
FIG. 6 is a partly broken, typical perspective view of a conventional electro-optical plasma addressing device.
Figure 7:
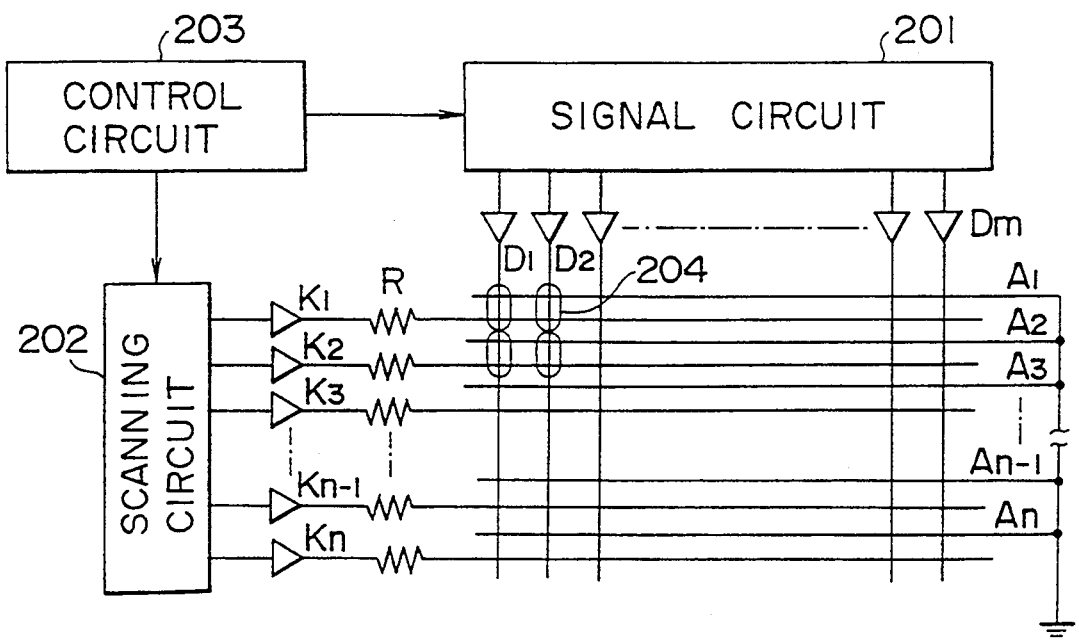
FIG. 7 is a driving circuit included in the conventional electro-optical plasma addressing device of FIG. 6.
Figure 8:
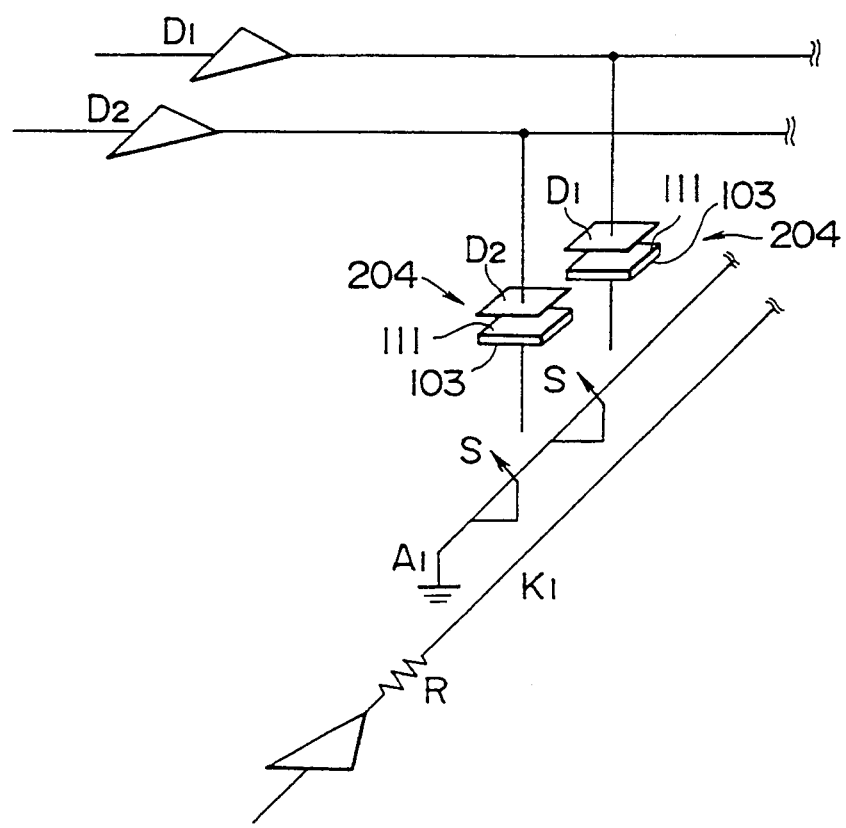
FIG. 8 is a diagrammatic view of some picture elements among those shown in FIG. 7.

FIG. 5 shows the second electrodes 8 shown in FIG. 4. In FIG. 5, only two adjacent second electrodes 8 serving as an anode A and a cathode K, respectively, are shown to facilitate understanding. The laminated second electrodes can be formed, for example, by a thick-film printing process. The terminal layers 21, i.e., the lowermost layers, and the discharge pads 23, i.e., the uppermost layers, are formed by printing a metal paste, such as a Ni paste or an Al paste, and the resistive layers 22 are formed by printing, for example, a metal paste obtained by adding dielectric glass or an insulating material, such as alumina, to the foregoing metal paste in a high additive content. The resistivity of the metal paste containing such an additive can be adjusted by properly determining the additive content of the metal paste. The terminal layer 21 must be perfectly covered with the resistive layer 22 and must not be exposed to the discharge space. The terminal layer 21 and the discharge pads 23 must not be electrically shorted. Preferably, the exposed portion of the resistive layer 22 is coated with a thin insulating film to prevent the involvement of the resistive layer 22 in plasma discharge.

Concretely, the terminal layer 21 is about 250 $\mu$m wide, and about 25 $\mu$m thick, the resistive layer 22 is about 300 $\mu$m wide and about 30 $\mu$m thick and has a resistivity of 77 k$\Omega$.cm, and the discharge pads 23 is about 200 $\mu$m wide, about 230 $\mu$m long and about 30 $\mu$m thick and are arranged discretely at a pitch of 250 $\mu$m corresponding to the pitch of picture elements, by way of example.

As is apparent from the foregoing description, according to the present invention, each of the second electrodes, i.e., discharge electrodes, has the three functionally differentiated portions, the discharge pads of each second electrode participating in plasma discharge are arranged discretely, and the display panel is provided internally with the loading resistors respectively associated with the discharge pads. Accordingly, uniform, stable plasma discharge can be produced over the entire length of the row scanning unit, the contrast of images is improved, power consumption of the electro-optical plasma addressing device is reduced and the life of the electro-optical plasma addressing device can be extended. The second electrode having the three functionally differentiated portions arranged in a plane can be formed by forming the same in an improved pattern without using any additional material.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. An electro-optical plasma addressing device comprising:
   a first substrate having a plurality of first electrodes arranged substantially in parallel to each other on a major surface thereof;;
   a second substrate opposed to the first substrate and having a plurality of second electrodes to define addressing units, each unit comprising an anode and a cathode for selectively ionizing a gas, said second electrodes having at least cathodes comprised of a discharge portion, a voltage supplying portion, and a resistive portion which connects the discharge portion and the voltage supplying portion, said voltage supplying portion and resistive portion being covered with an insulating layer;
   an electro-optical material layer positioned between the first and second substrates; and
   a discharge chamber formed between the electro-optical material layer and the second substrate.

2. An electro-optical plasma addressing device as claimed in claim 1; wherein said second electrode has a plurality of the discharge portions on the same plane each other, each discharge portion being extended from the voltage supplying portion through the resistive portions.

3. An electro-optical plasma addressing device as claimed in claim 1; wherein said discharge portion is formed on the resistive portion formed on the voltage supplying portion, and is separated on the resistive portion.

4. An electro-optical plasma addressing device as claimed in claim 2; wherein said insulating layer constitutes a barrier rib to define each addressing unit.

5. An electro-optical plasma addressing device as claimed in claim 1; further comprising a dielectric material layer disposed between the electro-optical material layer and the discharge chamber to isolate the electro-optical material layer from the gas.

6. An electro-optical plasma addressing device as claimed in claim 1; wherein said anode has the same configuration as that of the cathode.

7. An electro-optical plasma addressing device as claimed in claim 1; wherein said voltage supplying portion comprises a conductive member having a relatively low resistivity, and said resistive portion comprises a resistive member having a relatively high resistivity.

8. An electro-optical plasma addressing device as claimed in claim 1; wherein said electro-optical material layer comprises a liquid crystal.

* * * * *